United States Patent
Vankamamidi et al.

(10) Patent No.: US 12,373,105 B2
(45) Date of Patent: Jul. 29, 2025

(54) SYSTEM AND METHOD USING IOPS TO SERVICE PRIORITY QUEUES IN A DISTRIBUTED MANNER

(71) Applicant: Dell Products L.P., Round Rock, TX (US)

(72) Inventors: Vamsi K. Vankamamidi, Hopkinton, MA (US); Michael P. Wahl, Bulverde, TX (US); James H. Shimer, Georgetown, MA (US); Zhiyi Yang, Westborough, MA (US); Zhuoqun Yuan, Quincy, MA (US); Vibhash M. Desai, North Grafton, MA (US)

(73) Assignee: Dell Products L.P., Round Rock, TX (US)

( * ) Notice: Subject to any disclaimer, the term of this patent is extended or adjusted under 35 U.S.C. 154(b) by 74 days.

(21) Appl. No.: 18/162,190

(22) Filed: Jan. 31, 2023

(65) Prior Publication Data

US 2024/0256135 A1    Aug. 1, 2024

(51) Int. Cl.
*G06F 12/00*     (2006.01)
*G06F 3/06*     (2006.01)

(52) U.S. Cl.
CPC .......... *G06F 3/0611* (2013.01); *G06F 3/0659* (2013.01); *G06F 3/067* (2013.01)

(58) Field of Classification Search
CPC ...... G06F 3/0611; G06F 3/0659; G06F 3/067; G06F 3/06; G06F 11/1446; G06F 12/00; G06F 13/16
See application file for complete search history.

(56) References Cited

U.S. PATENT DOCUMENTS

| | | | |
|---|---|---|---|
| 2018/0103098 A1* | 4/2018 | Oelke | G06F 3/0683 |
| 2018/0275923 A1* | 9/2018 | Earhart | G06F 3/0604 |
| 2021/0034409 A1* | 2/2021 | Vankamamidi | G06F 3/067 |
| 2021/0034552 A1* | 2/2021 | Gokam | G06F 3/0604 |

\* cited by examiner

*Primary Examiner* — Arvind Talukdar
(74) *Attorney, Agent, or Firm* — Brian J. Colandreo; Heath M. Sargeant; Holland & Knight LLP

(57) ABSTRACT

A method, computer program product, and computing system for defining a plurality of IO processing queues within a storage system coupled to a storage platform, wherein the plurality of IO processing queues have differing priority levels; receiving one or more IO requests on the storage system coupled to the storage platform; assigning the one or more IO requests to one or more of the plurality of IO processing queues based, at least in part, upon a priority level of the one or more IO requests; and servicing the plurality of IO processing queues in a distributed fashion.

11 Claims, 4 Drawing Sheets

SYSTEM AND METHOD USING IOPS TO SERVICE PRIORITY QUEUES IN A DISTRIBUTED MANNER

TECHNICAL FIELD

This disclosure relates to storage management processes and, more particularly, to storage management processes for use in high-availability storage systems.

BACKGROUND

Storing and safeguarding electronic content is of paramount importance in modern business. Accordingly, various methodologies may be employed to protect and distribute such electronic content, wherein the storage systems that process such content may strive to do so in as an efficient manner as possible.

As storage is being migrated from onprem (i.e., on premises) to the cloud, technical hurdles often complicate things. For example, IOPS (input-output-operations-per-second) bottlenecks may be encountered that result in a level of latency that is undesirable when compared to onprem storage.

Summary of Disclosure

In one implementation, a computer-implemented method is executed on a computing system and includes: defining a plurality of IO processing queues within a storage system coupled to a storage platform, wherein the plurality of IO processing queues have differing priority levels; receiving one or more IO requests on the storage system coupled to the storage platform; assigning the one or more IO requests to one or more of the plurality of IO processing queues based, at least in part, upon a priority level of the one or more IO requests; and servicing the plurality of IO processing queues in a distributed fashion.

One or more of the following features may be included. The storage system may be a log-based storage system. The storage platform may be a cloud-based storage platform. The priority level of the one or more IO requests may be assigned by the storage system. Servicing the plurality of IO processing queues in a distributed fashion may include: defining a quantity of processing tokens based, at least in part, upon a defined maximum IOPS rate for the storage platform, wherein a processing token may allow an IO processing queue to process at least one IO request within the IO processing queue. Servicing the plurality of IO processing queues in a distributed fashion may further include: distributing the quantity of processing tokens amongst the plurality of IO processing queues, thus allowing the plurality of IO processing queues to process IO requests contained therein. Servicing the plurality of IO processing queues in a distributed fashion may further include: sequentially enabling a specific IO processing queue, included within the plurality of IO processing queues, to process IO requests contained therein based, at least in part, upon the quantity of processing tokens available to the specific IO processing queue.

In another implementation, a computer program product resides on a computer readable medium and has a plurality of instructions stored on it. When executed by a processor, the instructions cause the processor to perform operations including defining a plurality of IO processing queues within a storage system coupled to a storage platform, wherein the plurality of IO processing queues have differing priority levels; receiving one or more IO requests on the storage system coupled to the storage platform; assigning the one or more IO requests to one or more of the plurality of IO processing queues based, at least in part, upon a priority level of the one or more IO requests; and servicing the plurality of IO processing queues in a distributed fashion.

One or more of the following features may be included. The storage system may be a log-based storage system. The storage platform may be a cloud-based storage platform. The priority level of the one or more IO requests may be assigned by the storage system. Servicing the plurality of IO processing queues in a distributed fashion may include: defining a quantity of processing tokens based, at least in part, upon a defined maximum IOPS rate for the storage platform, wherein a processing token may allow an IO processing queue to process at least one IO request within the IO processing queue. Servicing the plurality of IO processing queues in a distributed fashion may further include: distributing the quantity of processing tokens amongst the plurality of IO processing queues, thus allowing the plurality of IO processing queues to process IO requests contained therein. Servicing the plurality of IO processing queues in a distributed fashion may further include: sequentially enabling a specific IO processing queue, included within the plurality of IO processing queues, to process IO requests contained therein based, at least in part, upon the quantity of processing tokens available to the specific IO processing queue.

In another implementation, a computing system includes a processor and memory is configured to perform operations including defining a plurality of IO processing queues within a storage system coupled to a storage platform, wherein the plurality of IO processing queues have differing priority levels; receiving one or more IO requests on the storage system coupled to the storage platform; assigning the one or more IO requests to one or more of the plurality of IO processing queues based, at least in part, upon a priority level of the one or more IO requests; and servicing the plurality of IO processing queues in a distributed fashion.

One or more of the following features may be included. The storage system may be a log-based storage system or the storage platform may be a cloud-based storage platform. The priority level of the one or more IO requests may be assigned by the storage system. Servicing the plurality of IO processing queues in a distributed fashion may include: defining a quantity of processing tokens based, at least in part, upon a defined maximum IOPS rate for the storage platform, wherein a processing token may allow an IO processing queue to process at least one IO request within the IO processing queue. Servicing the plurality of IO processing queues in a distributed fashion may further include: distributing the quantity of processing tokens amongst the plurality of IO processing queues, thus allowing the plurality of IO processing queues to process IO requests contained therein. Servicing the plurality of IO processing queues in a distributed fashion may further include: sequentially enabling a specific IO processing queue, included within the plurality of IO processing queues, to process IO requests contained therein based, at least in part, upon the quantity of processing tokens available to the specific IO processing queue.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
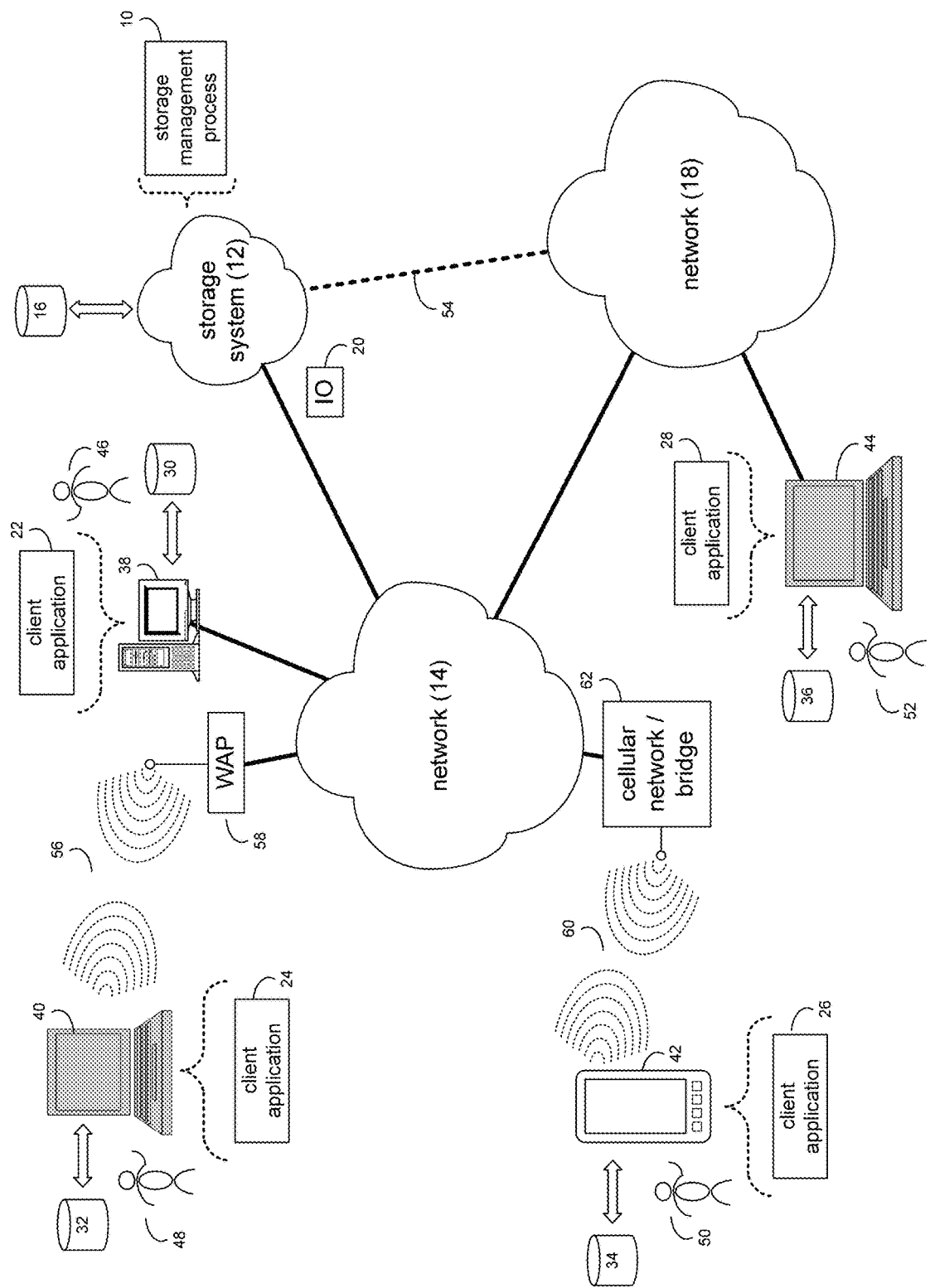
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a personal computer with a memory system, a server computer with a memory system, a Network Attached Storage (NAS) system, a Storage Area Network (SAN) and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 coupled to storage system 12, may be executed by one or more processors (not shown) and one or more memory architectures (not shown) included within storage system 12. Storage device 16 may include but is not limited to: a hard disk drive; an optical drive; a RAID device; a random-access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g., IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

Figure 2:
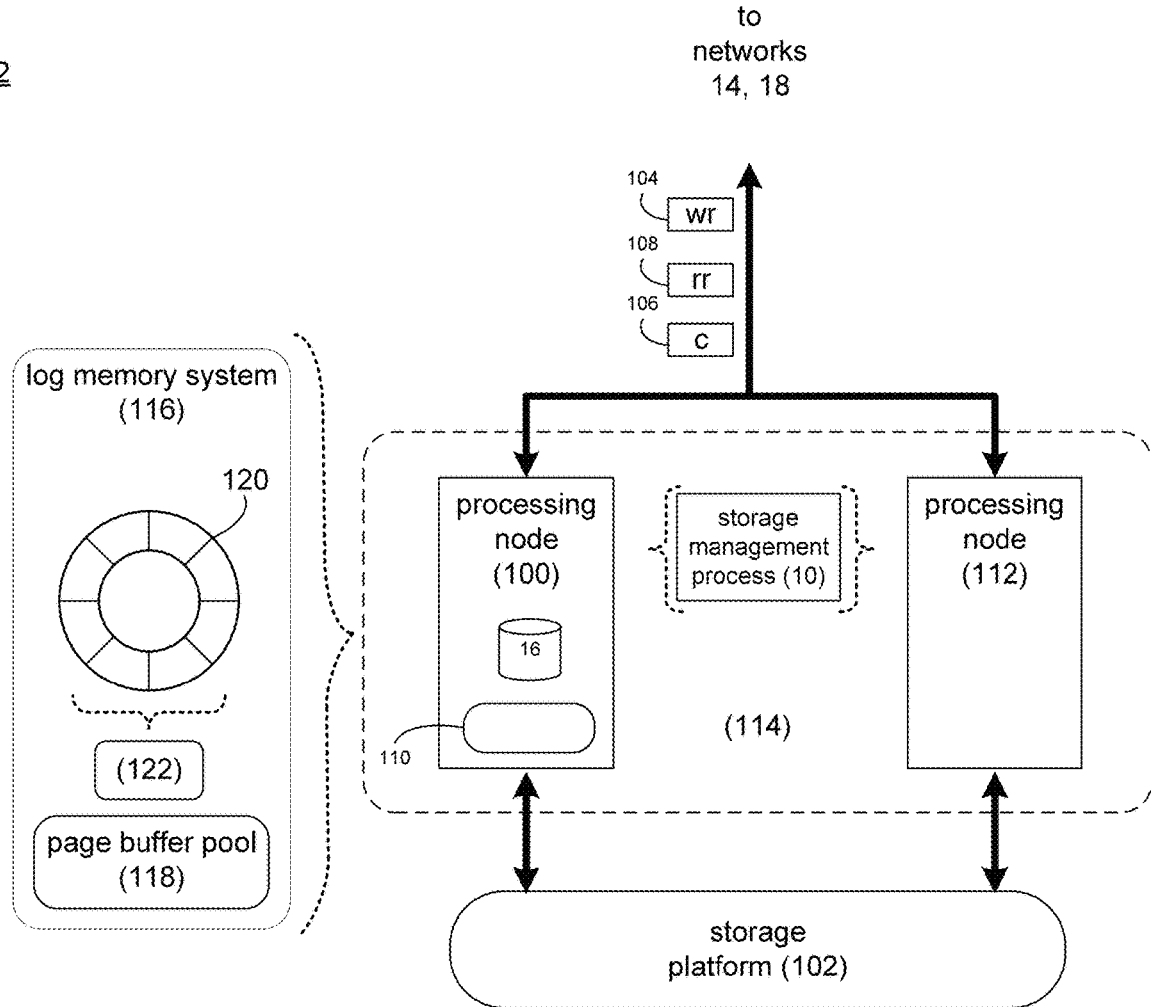
FIG. 2 is a diagrammatic view of the storage system of FIG. 1.

The Data Storage System:

Referring also to FIG. 2, there is shown a general implementation of storage system 12. In this general implementation, storage system 12 may include processing node 100, wherein processing node 100 may be configured to perform computational tasks and to store data within storage platform 102.

Depending upon the manner in which storage system 12 is configured, storage platform 102 may include a single storage device (such as a single hard disk drive or a single solid state storage device) or may include a plurality of storage devices that are configured to provide various levels of performance and/or high availability. For example and if storage platform 102 includes a plurality of storage devices (e.g., hard disk drives and/or solid state storage devices), this plurality of storage devices may be configured to form a RAID storage array utilizing various standard RAID structures (e.g., RAID 0, RAID 1, RAID 3, RAID 5, RAID 6, RAID 7 or RAID 10), thus providing a higher level of performance and/or availability. Further, storage platform 102 may be a cloud-based storage platform that provides virtualized storage functionality to (in this example) users 46, 48, 50, 52.

As is known in the art, cloud storage is a model of computer data storage in which the digital data is stored in logical pools, said to be on "the cloud". The physical storage spans multiple servers (sometimes in multiple locations) and the physical environment is typically owned and managed by a hosting company. These cloud storage providers are responsible for keeping the data available and accessible, and the physical environment secured, protected, and running. People and organizations buy or lease storage capacity from the providers to store user, organization, or application data. Cloud storage services may be accessed through a collocated cloud computing service, a web service application programming interface (API) or by applications that use the API, such as cloud desktop storage, a cloud storage gateway or Web-based content management systems.

Storage system 12 may be configured to execute all or a portion of storage management process 10. The instruction sets and subroutines of storage management process 10, which may be stored on a storage device (e.g., storage device 16) coupled to e.g., processing node 100, may be executed by one or more processors (not shown) and one or more memory architectures (not shown) included within processing node 100. Storage device 16 may include but is not limited to: a hard disk drive; a RAID device; a random-access memory (RAM); a read-only memory (ROM); and all forms of flash memory storage devices.

As discussed above, various IO requests (e.g., IO request 20) may be generated. For example, these IO requests may be sent from client applications 22, 24, 26, 28 to storage system 12. Additionally/alternatively and when storage system 12 is configured as an application server, these IO requests may be internally generated within storage system 12. Examples of IO request 20 may include but are not limited to data write request 104 (i.e., a request that content 106 be written to storage system 12) and data read request 108 (i.e., a request that content 106 be read from storage system 12).

During operation of processing node 100, content 106 to be written to storage system 12 may be processed by processing node 100. Additionally/alternatively and when storage system 12 is configured as an application server, content 106 to be written to storage system 12 may be internally generated by processing node 100.

Processing node 100 may include cache memory system 110. Examples of cache memory system 110 may include but are not limited to a volatile, solid-state, cache memory system (e.g., a static RAM cache memory system) and/or a non-volatile, solid-state, cache memory system (e.g., a flash-based, cache memory system). Processing node 100 may initially store content 106 within cache memory system 110. Depending upon the manner in which cache memory system 110 is configured, processing node 100 may immediately write content 106 to storage platform 102 (if cache memory system 110 is configured as a write-through cache) or may subsequently write content 106 to storage platform 102 (if cache memory system 110 is configured as a write-back cache).

Storage system 12 may be configured to include a plurality of processing nodes, each of which may be configured to receive, generate and/or process content (e.g., content 106). For example and in addition to processing node 100, storage system 12 may include one or more additional processing nodes (e.g., processing node 112).

In some implementations, storage system 12 may include multi-node active-active storage clusters configured to provide high availability to a user. As is known in the art, the term "high availability" may generally refer to systems or components that are durable and likely to operate continuously without failure for a long time. For example, an active-active storage cluster (e.g., computing cluster 114) may be formed from at least two nodes (e.g., processing nodes 100, 112), both actively running the same kind of service(s) simultaneously. One purpose of an active-active cluster (e.g., computing cluster 114) may be to achieve load balancing. Load balancing may distribute workloads across all nodes in order to prevent any single node from getting overloaded. Because there are more nodes available to serve, there will also be a marked improvement in throughput and response times. Another purpose of an active-active cluster (e.g., computing cluster 114) may be to provide at least one active node in the event that one of the nodes in the active-active cluster fails.

Log-Based Storage System:

Storage system 12 may be configured as a log-based storage system. If so configured, storage management process 10 may store received data in a log memory system (e.g., log memory system 116). As is known in the art, a log memory system (e.g., log memory system 116) may generally include one or more non-volatile random-access memory (NVRAM) devices configured to store a log of the data written to storage system 12. Additionally/alternatively, the log of the data written to storage system 12 may be stored on a remote storage device (e.g., solid state storage on a backend device of the cloud storage provider).

As discussed above, an example of IO request 20 may include but is not limited to data write request 104 (i.e., a request that content 106 be written to storage system 12). Further and as discussed above, upon receiving data write request 104 and content 106, data write request 104 and content 106 may be written to cache memory system 110 (which may be volatile). However and when configured as a log-based storage system, upon receiving data write request 104 and content 106, data write request 104 and/or content 106 may also be written to log memory system 116 (which is persistent).

Therefore and through the use of log memory system 116, the content of cache memory system 110 (e.g., data write request 104 and content 106) may be recovered (via log memory system 116) in the event of a power failure and/or a failure of cache memory system 110. Further and due to such failure recoverability, data (e.g., content 106) may be considered to be persistently stored (i.e., as if stored in storage platform 102) once such data (e.g., content 106) is saved within log memory system 116. Therefore, once such data (e.g., content 106) is saved within log memory system 116, a write acknowledgement may be provided to the sender of data write request 104, acknowledging the successful saving of such data (e.g., content 106), wherein such data (e.g., content 106) may be subsequently written to storage platform 102.

Log memory system 116 may include a page buffer pool (e.g., page buffer pool 118) and/or a page descriptor ring buffer (e.g., page descriptor ring buffer 120) to effectuate the above-described temporary storage of (in this example) content 106. For example, storage management process 10 may store one or more pages (associated with content 106) in one or more page buffers within page buffer pool 118 based, at least in part, upon the processing of (in this example) write request 104. Further, storage management process 10 may store information concerning the data (e.g., content 106) stored within log memory system 116 in a page descriptor (e.g., page descriptor 122), wherein page descriptor 122 may generally include a reference (i.e., a pointer) to the related page buffer(s) within page buffer pool 118. Page descriptor 122 may also include a sequence transaction number that tracks the order of write operations and/or other types of information.

Storage management process 10 may store each page descriptor (e.g., page descriptor 122) in a page descriptor ring buffer (e.g., page descriptor ring buffer 120). As is known in the art, a page descriptor ring buffer may allow data to be added to the "head" of the page descriptor ring buffer and released or overwritten from the tail of the page descriptor ring buffer. Accordingly, page descriptor ring buffer 120 may appear to be circular in that older data is overwritten with newer data as data (e.g., content 106) is moved from page buffer pool 118 to storage platform 102.

Figure 3:
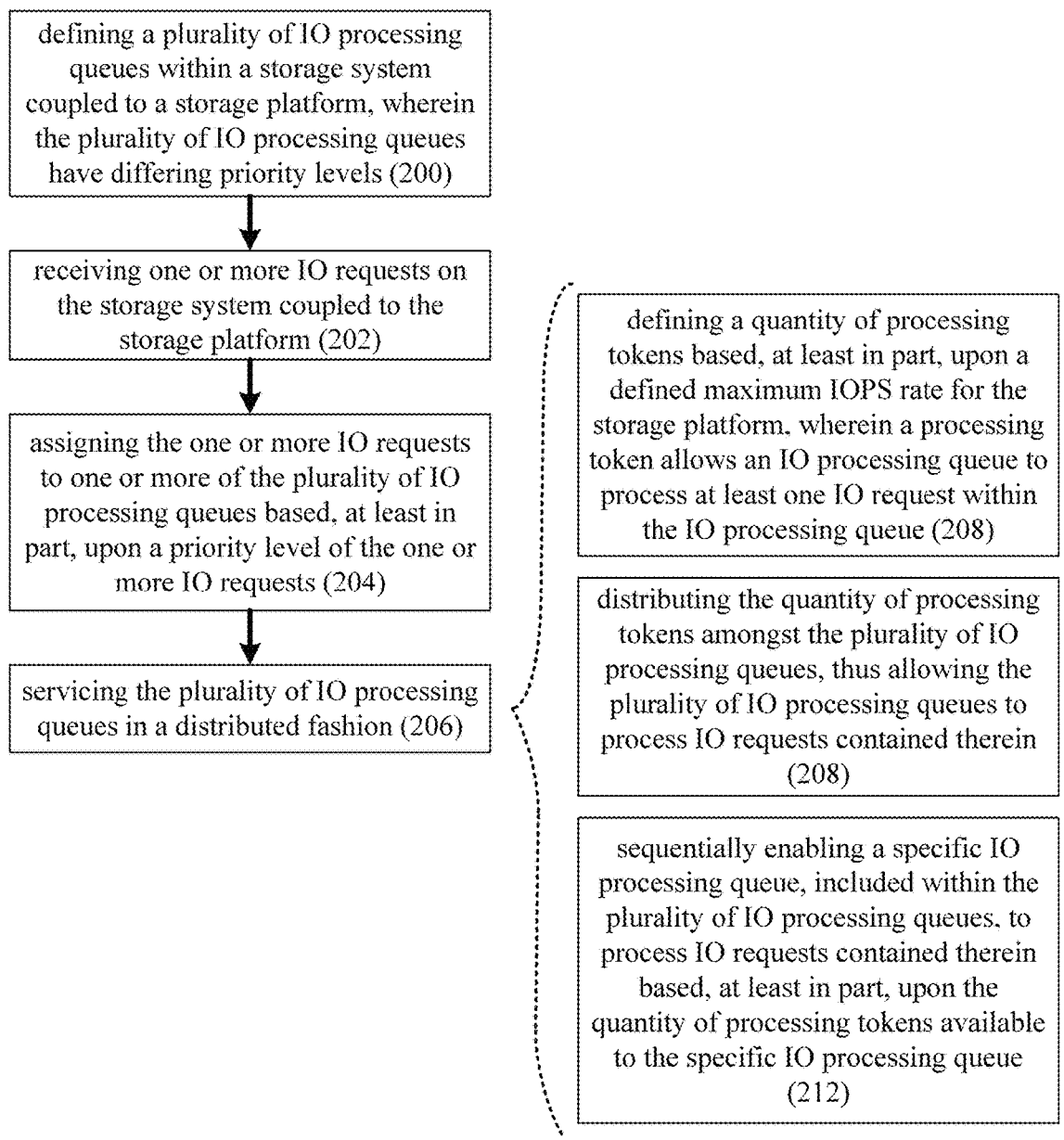
FIG. 3 is a flow chart of the storage management process of FIG. 1.
Figure 4:
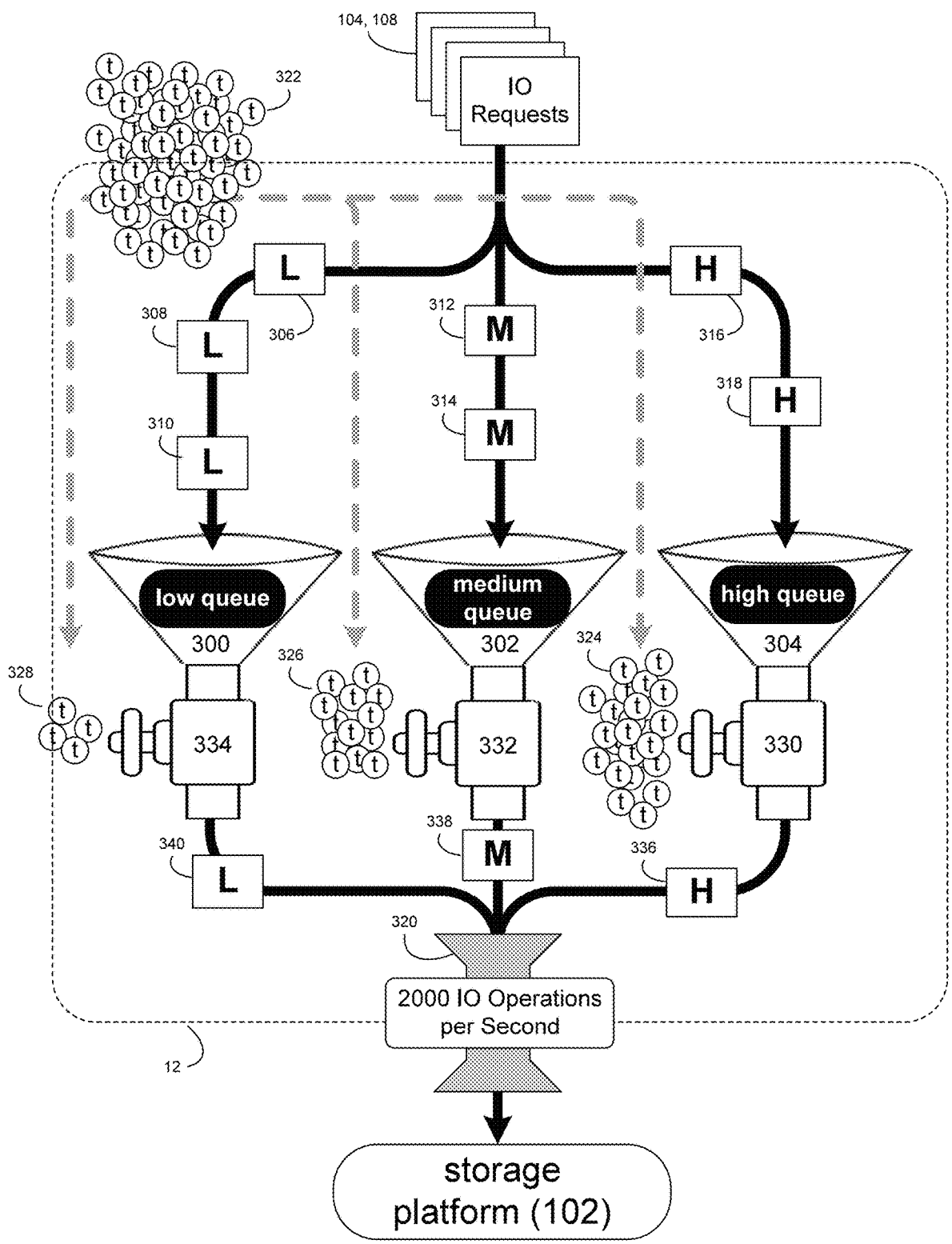
FIG. 4 is another diagrammatic view of the storage system of FIG. 1.

Storage Management Process:

Referring also to FIGS. 3-4, storage management process 10 may define 200 a plurality of IO processing queues (e.g., processing queues 300, 302, 304) within a storage system (e.g., storage system 12) coupled to a storage platform (e.g., storage platform 102), wherein the plurality of IO processing queues (e.g., processing queues 300, 302, 304) may have differing priority levels. While in this particular example, there are three processing queues (e.g., processing queues 300, 302, 304), this is for illustrative purposes only and is not intended to be a limitation of this disclosure, as other configurations are possible and are considered to be within the scope of this disclosure. For example, the number of processing queues may be increased/decreased in accordance with needs/design criteria.

As discussed above, various IO requests (e.g., IO request 20) may be sent from client applications 22, 24, 26, 28 to storage system 12. Examples of IO request 20 may include but are not limited to data write requests (e.g., write request 104, which is a request that content 106 be written to storage system 12) and data read requests (e.g., read request 108, which is a request that content 106 be read from storage system 12). Additionally/alternatively, various IO requests may be generated internally by the storage system (e.g., storage system 12), wherein examples of such internally-generated IO requests may include but are not limited to bookkeeping IO requests (e.g., defragmentation IO requests and deduplication IO requests) that compete for limited backend resource.

Storage management process 10 may receive 202 one or more IO requests (e.g., write request 104 and/or read request 108) on the storage system (e.g., storage system 12) coupled to the storage platform (e.g., storage platform 102). As discussed above, the storage system (e.g., storage system 12) may be a log-based storage system that includes one or more non-volatile random-access memory (NVRAM) devices configured to store a log of the data written to storage system 12. Further and as discussed above, the storage platform (e.g., storage platform 102) may be a cloud-based storage platform, wherein cloud storage is a model of computer data storage in which the digital data is stored in logical pools and the physical storage spans multiple servers (sometimes in multiple locations).

Storage management process 10 may assign 204 the one or more IO requests (e.g., write request 104 and/or read request 108) to one or more of the plurality of IO processing queues (e.g., processing queues 300, 302, 304) based, at least in part, upon a priority level of the one or more IO requests (e.g., write request 104 and/or read request 108). The priority level of the one or more IO requests (e.g., write request 104 and/or read request 108) may be assigned by the storage system (e.g., storage system 12) or may arrive pre-assigned.

For example, some or all of the one or more IO requests (e.g., write request 104 and/or read request 108) may arrive at storage system 12 from client applications 22, 24, 26, 28 without any priority levels assigned to them. In such a situation, the storage system (e.g., storage system 12) may assign a priority level to these IO requests (e.g., write request 104 and/or read request 108) based upon one or more rules. For example, bookkeeping IO requests (e.g., deduping of content stored within storage platform 102) may be assigned a low-priority level (e.g., as these are generally backend services); write IO requests may be assigned a mid-priority level (e.g., if storage system 12 is a log-based storage system for the reasons discussed above); and read IO requests may be assigned a high-priority level (e.g., as read latency is typically avoided). Additionally/alternatively, some or all of the one or more IO requests (e.g., write request 104 and/or read request 108) may arrive at storage system 12 from client applications 22, 24, 26, 28 with priority levels preassigned to them. For example, client applications 22, 24, 26, 28 may be configured to assign priority levels to IO requests based upon e.g., whether they are a write IO requests (e.g., write request 104) or read IO requests (e.g., read IO request 108).

Regardless of whether the priority level of the one or more IO requests (e.g., write request 104 and/or read request 108) are assigned by storage system 12 or arrive pre-assigned, storage system 12 may assign 204 these IO requests (e.g., write request 104 and/or read request 108) to the plurality of IO processing queues (e.g., processing queues 300, 302, 304) based, at least in part, upon the priority level assigned to each of the IO requests (e.g., write request 104 and/or read request 108). For example, low-priority level IO requests 306, 308, 310 may be assigned 204 to processing queue 300; mid-priority level IO requests 312, 314 may be assigned 204 to processing queue 302; and high-priority level IO requests 316, 318 may be assigned 204 to processing queue 304.

Storage management process 10 may service 206 the plurality of IO processing queues (e.g., processing queues 300, 302, 304) in a distributed fashion. One example of such a distributed fashion may include but is not limited to a round-robin fashion in which e.g., high-priority queue 304 may be serviced first; mid-priority queue 302 may be serviced after the servicing of high-priority queue 304 is completed; and low-priority queue 300 may be serviced after the servicing of mid-priority queue 302 is completed.

When storage management process 10 services 206 the plurality of IO processing queues (e.g., processing queues 300, 302, 304) in a distributed fashion, storage management process 10 may sequentially allow for the processing of IO requests within an specific IO processing queue (e.g., processing queues 300, 302, 304) during the time it is being serviced. Accordingly, high-priority queue 304 may be allowed to process IO requests contained therein; and then mid-priority queue 302 may be allowed to process IO requests contained therein; and then low-priority queue 300 may be allowed to process IO request contained therein; and then the sequence is repeated.

As discussed above, the storage platform (e.g., storage platform 102) may be a cloud-based storage platform. For this particular example, storage platform 102 may have a defined maximum IOPS rate, wherein this defined maximum IOPS rate may define a maximum number of IO operations per unit time. Typically, when utilizing a cloud-based storage platform (e.g., storage platform 102), access is granted to the user based upon such a defined maximum IOPS rate. Examples of such a defined maximum IOPS rate may include 1,000 IO operations per second, 2,000 IO operations per second, 3,000 IO operations per second, 5,000 IO operations per second, and 10,000 IO operations per second. Naturally, as the quantity of IO operations per unit time increases, the fee for such access also increases. Accordingly, it is in the interest of the user to only purchase the quantity of IO operations per unit time they need. However, in the event that such quantity is reached, access is typically paused (e.g., throttled) until the unit time is reset. Therefore, assume for this discussion that the plan selected is for 2,000 IO operations per second. Further assume that during the first ¼ of a second (i.e., 250 milliseconds), you use those 2,000 IO operations. Accordingly, you are going to be paused (e.g., throttled) for the next ¾ of a second (e.g., 750 milliseconds) until the unit time period resets. While the maximum IOPS rate is discussed above as being a backend resource access limiter, this is for illustrative purposes only. For example, other backend resource access limiters may be considered, such as the amount of data that may be transferred per unit time (e.g., the access may be limited to 800

MB/sec). Additionally, multiple backend resource access limiters may be simultaneously considered (e.g., an IOPS limit and a MB/second limit)

As will be discussed below in greater detail, in order to avoid the undesirable situation of getting paused (e.g., throttled), storage management process 10 may service 206 the plurality of IO processing queues (e.g., processing queues 300, 302, 304) in the above-described distributed fashion. Specifically and in the situation in which storage platform 102 is a cloud-based storage platform, the above-described defined maximum IOPS rate may function as a bottleneck (e.g., bottleneck 320) when passing requests/content to storage platform 102, thus requiring regulation to avoid a particular queue monopolizing storage platform 102. Additionally, there may be multiple bottlenecks that may be addressed in a hierarchical fashion. For example, there may be device/volume limiters as well as limiters at a higher level across groups of those limiters (e.g., at an "hba" or "instance" level). For instance, there may be 20 devices each with an IOPS limit of 5000 IOPS but an overall instance limit of 50000 IOPS (which is less than 20×5000 IOPS). Accordingly, the hierarchy needs to handled in a manner such that hitting one limit does not unduly impact another. For example, if the instance limit is considered first, tokens might be given for IOs to a device that has already hit its limit; thereby, "wasting" the instance tokens, which could have been used by IO to a different device that has not hit its limit.

Such regulation may be accomplished via the use of processing tokens (e.g., processing tokens 322), wherein a processing token may allow an IO processing queue (e.g., one of processing queues 300, 302, 304) to process at least one IO request within that IO processing queue (e.g., one of processing queues 300, 302, 304).

For example and when servicing 206 the plurality of IO processing queues (e.g., processing queues 300, 302, 304) in a distributed fashion, storage management process 10 may define 208 a quantity of processing tokens (e.g., processing tokens 322) based, at least in part, upon a defined maximum IOPS rate (e.g., 2,000 IO operations per second) for the storage platform (e.g., storage platform 102). As discussed above, a processing token (e.g., one of processing tokens 322) may allow an IO processing queue to process at least one IO request within the IO processing queue.

Accordingly, storage management process 10 may e.g., define 208 2,000 tokens per second (when a single token allows for the processing of a single IO request); 200 tokens per second (when a single token allows for the processing of ten IO requests); or 20 tokens per second (when a single token allows for the processing of one-hundred IO requests). Regardless of the "denomination" of the tokens defined 208, storage management process 10 may utilizes these tokens to regulate the flow of IO requests through the IO processing queues (e.g., processing queues 300, 302, 304) and bottleneck 320.

Additionally and when servicing 206 the plurality of IO processing queues (e.g., processing queues 300, 302, 304) in a distributed fashion, storage management process 10 may distribute 210 the quantity of processing tokens (e.g., processing tokens 322) amongst the plurality of IO processing queues (e.g., processing queues 300, 302, 304), thus allowing the plurality of IO processing queues (e.g., processing queues 300, 302, 304) to process IO requests contained therein.

For example, assume that it is desirable to prioritize the processing of high-priority queue 304 over mid-priority queue 302; and prioritize the processing of mid-priority queue 302 over low-priority queue 300. Therefore, storage management process may distribute 210 the 2,000 tokens (e.g., processing tokens 322) amongst the plurality of IO processing queues (e.g., processing queues 300, 302, 304) as follows:

60,000 processing tokens (e.g., high-priority processing tokens 324) may be given to high-priority queue 304, thus enabling high-priority queue 304 to process 60,000 IO requests contained within high-priority queue 304 when it is the "turn" of high-priority queue 304;

25,000 processing tokens (e.g., mid-priority processing tokens 326) may be given to mid-priority queue 302, thus enabling mid-priority queue 302 to process 25,000 IO requests contained within mid-priority queue 302 when it is the "turn" of mid-priority queue 302; and 15,000 processing tokens (e.g., low-priority processing tokens 328) may be given to low-priority queue 300, thus enabling low-priority queue 300 to process 15,000 IO requests contained within low-priority queue 300 when it is the "turn" of low-priority queue 300.

Further and when servicing 206 the plurality of IO processing queues (e.g., processing queues 300, 302, 304) in a distributed fashion, storage management process 10 may sequentially enable 212 a specific IO processing queue (e.g., one of processing queues 300, 302, 304), included within the plurality of IO processing queues (e.g., processing queues 300, 302, 304) to process IO requests contained therein based, at least in part, upon the quantity of processing tokens (e.g., processing tokens 322) available to the specific IO processing queue (e.g., one of processing queues 300, 302, 304).

For example, each of the plurality of IO processing queues (e.g., processing queues 300, 302, 304) may essentially include a controller (e.g., controller 334, 332, 330 respectively) that functions as a "toll booth" that only allows an IO request to pass through after the "payment" of a token. So as long as tokens are available to a particular IO processing queue, that IO processing queue may continue to process tokens and allow them to pass through and enter bottleneck 320.

For example:
the 60,000 processing tokens (e.g., high-priority processing tokens 324) available to high-priority queue 304 every second may allow high-priority queue 304 to process 60,000 IO requests contained within high-priority queue 304 when storage management process 10 sequentially enables 212 high-priority queue 304, thus allowing e.g., high-priority IO request 336 to pass through controller 330 and enter bottleneck 320;

the 25,000 processing tokens (e.g., mid-priority processing tokens 326) available to mid-priority queue 302 every second may allow mid-priority queue 302 to process 25,000 IO requests contained within mid-priority queue 302 when storage management process 10 sequentially enables 212 mid-priority queue 302, thus allowing e.g., mid-priority IO request 338 to pass through controller 332 and enter bottleneck 320; and the 15,000 processing tokens (e.g., low-priority processing tokens 328) available to low-priority queue 300 every second may allow low-priority queue 300 to process 15,000 IO requests contained within low-priority queue 300 when storage management process 10 sequentially enables 212 low-priority queue 300, thus allowing e.g., low-priority IO request 340 to pass through controller 334 and enter bottleneck 320.

Through the use of the above-described system, tokens may be distributed across the various priority queues. Additionally, the above-described system may allow for full utilization of a underutilized resource having a given priority by allowing another priority to utilize some or all of the tokens of the underutilized resource during a given cycle. For example, assume that the token distribution is 60/25/15 tokens for high/medium/low priority queues respectively. However and during a given cycle, there are no medium or low priority IO requests. Accordingly, the medium/low priority tokens may be utilized to process high priority IOs (thus enabling the high priority queue to utilize all 100 tokens)

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing system, comprising:
    defining, by a processor, a plurality of IO processing queues within a storage system coupled to a storage platform, wherein the plurality of IO processing queues have differing priority levels;
    receiving, by the processor, one or more IO requests at the storage system coupled to the storage platform;
    assigning, by the processor, the one or more IO requests to one or more of the plurality of IO processing queues based, at least in part, upon a priority level assigned to the one or more IO requests;
    defining, by the processor, a quantity of processing tokens based, at least in part, upon a defined maximum IOPS rate for the storage platform, wherein a processing token allows an IO processing queue to process at least one IO request within the IO processing queue;
    servicing, by the processor, the plurality of IO processing queues in a distributed fashion by:
        distributing a quantity of high-priority processing tokens to a high-priority IO processing queue amongst the plurality of IO processing queues,
        distributing a quantity of mid-priority processing tokens to a mid-priority IO processing queue amongst the plurality of IO processing queues, and
        distributing a quantity of low-priority processing tokens to a low-priority IO processing queue amongst the plurality of IO processing queues; and
    sequentially enabling, by the processor, a specific IO processing queue, included within the plurality of IO processing queues, to process IO requests contained therein based, at least in part, upon the quantity of processing tokens available to the specific IO processing queue by:
        processing the quantity of high-priority processing tokens on a controller of the high-priority IO processing queue and passing an IO request contained within the high-priority IO processing queue to a bottleneck defined by the maximum IOPS rate for the storage platform for each high-priority processing token,
        processing the quantity of mid-priority processing tokens on a controller of the mid-priority IO processing queue and passing an IO request contained within the mid-priority IO processing queue to the bottleneck for each mid-priority processing token, and
        processing the quantity of low-priority processing tokens on a controller of the low-priority IO processing queue and passing an IO request contained within the low-priority IO processing queue to the bottleneck for each low-priority processing token.

2. The computer-implemented method of claim 1 wherein the storage system is a log-based storage system.

3. The computer-implemented method of claim 1 wherein the storage platform is a cloud-based storage platform.

4. The computer-implemented method of claim 1 wherein the priority level of the one or more IO requests is assigned by the storage system.

5. A computer program product residing on a non-transitory computer readable medium having a plurality of instructions stored thereon which, when executed by a processor, cause the processor to perform operations comprising:
    defining a plurality of IO processing queues within a storage system coupled to a storage platform, wherein the plurality of IO processing queues have differing priority levels;
    receiving one or more IO requests at the storage system coupled to the storage platform;
    assigning the one or more IO requests to one or more of the plurality of IO processing queues based, at least in part, upon a priority level assigned to the one or more IO requests;
    defining a quantity of processing tokens based, at least in part, upon a defined maximum IOPS rate for the storage platform, wherein a processing token allows an IO processing queue to process at least one IO request within the IO processing queue;
    servicing the plurality of IO processing queues in a distributed fashion by:
        distributing a quantity of high-priority processing tokens to a high-priority IO processing queue amongst the plurality of IO processing queues,
        distributing a second quantity of mid-priority processing tokens to a mid-priority IO processing queue amongst the plurality of IO processing queues, and
        distributing a quantity of low-priority processing tokens to a low-priority IO processing queue amongst the plurality of IO processing queues; and
    sequentially enabling a specific IO processing queue, included within the plurality of IO processing queues, to process IO requests contained therein based, at least in part, upon the quantity of processing tokens available to the specific IO processing queue by:
        processing the quantity of high-priority processing tokens on a controller of the high-priority IO processing queue and passing an IO request contained within the high-priority IO processing queue to a bottleneck defined by the maximum IOPS rate for the storage platform for each high-priority processing token,
        processing the quantity of mid-priority processing tokens on a controller of the mid-priority IO processing queue and passing an IO request contained within the mid-priority IO processing queue to the bottleneck for each mid-priority processing token, and processing the quantity of low-priority processing tokens on a controller of the low-priority IO processing queue and passing an IO request contained within the low-priority IO processing queue to the bottleneck for each low-priority processing token.

6. The computer program product of claim 5 wherein the storage system is a log-based storage system.

7. The computer program product of claim 5 wherein the storage platform is a cloud-based storage platform.

8. The computer program product of claim 5 wherein the priority level of the one or more IO requests is assigned by the storage system.

9. A computing system including a processor and memory configured to perform operations comprising:
   defining a plurality of IO processing queues within a storage system coupled to a storage platform, wherein the plurality of IO processing queues have differing priority levels;
   receiving one or more IO requests at the storage system coupled to the storage platform;
   assigning the one or more IO requests to one or more of the plurality of IO processing queues based, at least in part, upon a priority level assigned to the one or more IO requests;
   defining a quantity of processing tokens based, at least in part, upon a defined maximum IOPS rate for the storage platform, wherein a processing token allows an IO processing queue to process at least one IO request within the IO processing queue;
   servicing the plurality of IO processing queues in a distributed fashion by:
      distributing a quantity of high-priority processing tokens to a high-priority IO processing queue amongst the plurality of IO processing queues,
      distributing a quantity of mid-priority processing tokens to a mid-priority IO processing queue amongst the plurality of IO processing queues, and
      distributing a quantity of low-priority processing tokens to a low-priority IO processing queue amongst the plurality of IO processing queues; and
   sequentially enabling a specific IO processing queue, included within the plurality of IO processing queues, to process IO requests contained therein based, at least in part, upon the quantity of processing tokens available to the specific IO processing queue by:
      processing the quantity of high-priority processing tokens on a controller of the high-priority IO processing queue and passing an IO request contained within the high-priority IO processing queue to a bottleneck defined by the maximum IOPS rate for the storage platform for each high-priority processing token,
      processing the quantity of mid-priority processing tokens on a controller of the mid-priority IO processing queue and passing an IO request contained within the mid-priority IO processing queue to the bottleneck for each mid-priority processing token, and
      processing the quantity of low-priority processing tokens on a controller of the low-priority IO processing queue and passing an IO request contained within the low-priority IO processing queue to the bottleneck for each low-priority processing token.

10. The computing system of claim 9,
   wherein the storage system is a log-based storage system, and
   wherein the storage platform is a cloud-based storage platform.

11. The computing system of claim 9 wherein the priority level of the one or more IO requests is assigned by the storage system.

* * * * *